March 28, 1933.　　　J. ZUBATY　　　1,902,933
ELECTRIC GASOLINE GAUGE
Filed Sept. 29, 1930
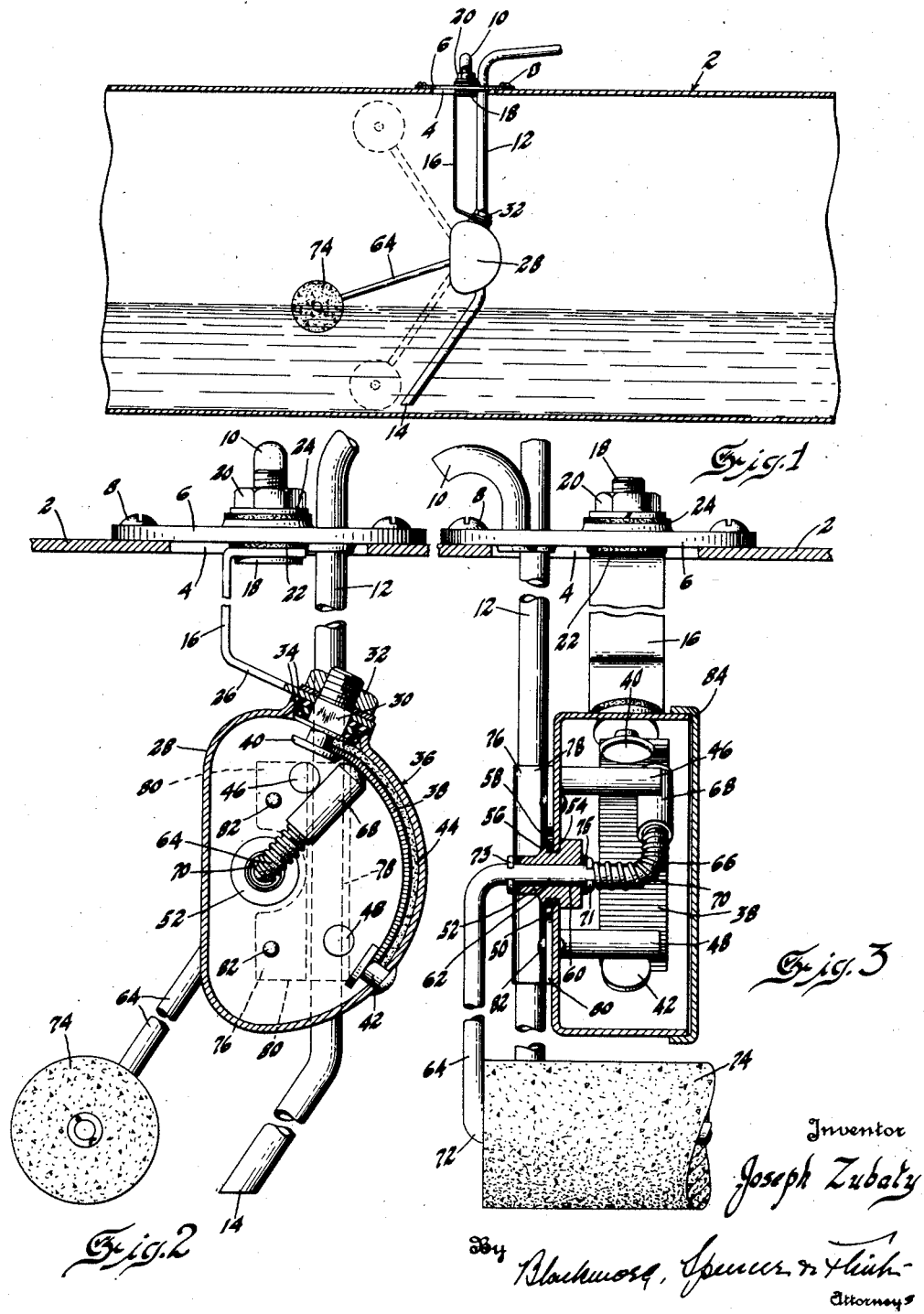
Inventor
Joseph Zubaty
By Blackmore, Spencer & Hindi
Attorneys Patented Mar. 28, 1933

1,902,933

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

ELECTRIC GASOLINE GAUGE

Application filed September 29, 1930. Serial No. 485,107.

This invention relates to liquid level indicators and has particular reference to improvements in liquid level indicators of the electrical type.

In prior level indicators of the electrical type in which a float movable with the level of the liquid transmitted its motion to a contact movable over a resistance, it was thought the resistance and contact must be mounted in liquid tight relation with reference to the fluid. The reason for this was due to the fact that where the indicator is used in connection with an inflammable substance such as gasoline, it was thought that a spark might be caused by the contact moving over the resistance which would ignite the gasoline vapor and cause an explosion. In the investigation which was conducted along these lines it was found that this apparent difficulty was greatly magnified and in reality the danger of ignition is substantially negligible. It has been found that the quantity of electricity flowing through the resistance was so small and the possibility of the contact creating a spark was so remote that it was not worthy of serious consideration. Accordingly, the resistance and contact in the present invention are mounted directly inside the tank at substantially the mid level of the liquid. In the case of fuel tanks, the gasoline is allowed to pass in and out of the housing in which the resistance is mounted.

The object of the invention is accomplished by securing to a plate which is mounted over an opening in the gasoline tank a conductor bracket which extends inward of the tank to substantially mid level of the liquid. A housing is secured to the bracket and insulated therefrom and in the housing an arcuate resistance is secured in insulated relation therewith. The bracket is also insulated from the plate and the electric current transmitted from the resistance through the bracket. A float arm having a float secured thereto is pivoted to the housing and moves a contact over the resistance in response to movements of the float. The usual pipe for withdrawing gasoline from the tank is also mounted in the plate and the housing secured to the pipe.

On the drawing:

Figure 1 shows a section through the gasoline tank of an automotive vehicle showing the invention applied.

Figure 2 is an enlarged sectional detail view of the structure of Figure 1.

Figure 3 is a side view of Figure 2 with parts shown in section.

Referring to the drawing, the numeral 2 indicates the gasoline tank of an automotive vehicle, although it may represent any liquid container. The tank has an opening 4 in its upper portion which is closed by means of the plate 6 secured to the tank by means of the screws 8. A goose-neck portion 10, which serves as a vent for the gasoline tank, is secured to the plate 6.

Also extending through and rigidly secured to the plate 6 is the pipe 12 which has its lower end 14 adjacent the bottom of the tank. The tube 12 serves to withdraw the gasoline from the tank.

Mounted on the plate 6 is the bracket 16. The bracket is secured to the plate by means of a bolt 18 and nut 20 spaced from the plate 6 by means of the insulated washers 22 and 24 so as to be out of electrical contact therewith. The electrical connection is secured to the bolt 18. The lower end of the bracket is bent as indicated at 26 and has secured thereto the housing 28 by means of bolt 30 and nut 32. The bolt and nut are insulated from the housing 28 by means of the insulating washers 34.

One side of the housing 28 is arcuate in form as shown at 36 and has mounted therein the resistance 38 held in position by the head 40 of the bolt 30 and the rivet 42. A strip of insulation 44 is positioned between the resistance and the arcuate side of the housing 28. Suitable stop pins 46 and 48 are secured from the housing adjacent the end of the resistance 38.

One side of the housing 28 is provided with an opening 50 for the reception of a bearing member 52. The bearing member 52 has the shoulder 54 interiorly of the housing and exteriorly is provided with the annular flange 56 seated against a washer 58 to rigidly hold the bearing member 52 in place.

The bearing member is provided with a central opening 60 in which there is received the bearing portion 62 of a float rod 64. Interiorly of the housing the float rod is bent at an angle as shown at 66 and a copper cap 68 placed on the end thereof. A spring 70 surrounds the rod 64 and presses the cap against the resistance 38. The rod 64 is pinched at 71 and 73 to hold the bearing portion in place against the washers 75.

The other end of the float arm 64 is also bent at an angle as indicated at 72 and has a suitable float 74 mounted thereon.

A bracket 76 is shown as having a semicircular portion 78 which fits over the pipe 12 and a flat portion 80 which is secured to the housing 28 by means of the rivets 82. The purpose of this structure is to rigidly hold the housing 28 and pipe 12 together.

One side of the housing 28 is provided with the removable cap or cover 84.

The operation of the device is well known. A differential galvanometer or ohmmeter is located at the instrument board. The movement of the contact 68 over the resistance 38 will vary the current in the galvanometer coils and change the position of the needle. A galvanometer of the type used is shown in the patent to E. F. Bacon, 1,791,786.

I claim:

1. In an electric liquid level indicator for application to liquid containers, a pipe for the outflow of the liquid from the container, a bracket secured to and extending into the container adjacent the pipe, a housing within the container and secured to both pipe and bracket, means to secure said pipe and bracket permanently and rigidly together, a float arm pivotally mounted in the housing, a resistance in the housing, a float on one end of the arm movable in response to changes in liquid level caused by the outflow through the pipe, and a contact on the other end of the arm in the housing and adapted to move over the resistance in response to movements of the float.

2. In an electric liquid level indicator for application to liquid containers, a fuel line for withdrawing liquid from said container, an electric resistance, means for mounting said resistance inside said container, said resistance at times surrounded by the liquid, a float in said tank responsive to changes in liquid level produced by the withdrawal of fuel through said fuel line, means permanently and rigidly securing said fuel line to said mounting means, and an arm on said float adapted to move a contact over said resistance.

In testimony whereof I affix my signature.

JOSEPH ZUBATY.